(12) United States Patent
Labrecque et al.

(10) Patent No.: US 9,951,690 B2
(45) Date of Patent: Apr. 24, 2018

(54) LOW NOISE AEROENGINE INLET SYSTEM

(71) Applicant: PRATT & WHITNEY CANADA CORP., Longueuil (CA)

(72) Inventors: Michel Labrecque, St-Bruno (CA); Vincent Couture-Gagnon, Boucherville (CA); Richard Ullyott, St-Bruno (CA)

(73) Assignee: PRATT & WHITNEY CANADA CORP., Longueuil, Quebec ( * ) Notice: Subject to any disclaimer, the term of this patent is extended or adjusted under 35 U.S.C. 154(b) by 630 days.

(21) Appl. No.: 14/463,077

(22) Filed: Aug. 19, 2014

(65) Prior Publication Data

US 2016/0053685 A1 Feb. 25, 2016

(51) Int. Cl.
*F02C 7/042* (2006.01)
*F02C 7/045* (2006.01)
*F01D 17/14* (2006.01)

(52) U.S. Cl.
CPC ............ *F02C 7/045* (2013.01); *F01D 17/143* (2013.01); *F01D 17/146* (2013.01); *F02C 7/042* (2013.01); *F05D 2260/963* (2013.01); *Y02T 50/672* (2013.01)

(58) Field of Classification Search
CPC ........ F02C 7/042; F02C 7/045; F01D 17/143; F01D 17/146
See application file for complete search history.

(56) References Cited

U.S. PATENT DOCUMENTS

| | | | |
|---|---|---|---|
| 2,752,111 A | 6/1956 | Schairer | |
| 3,421,296 A | 1/1969 | Beurer | |
| 3,532,129 A | 10/1970 | Ward et al. | |
| 3,533,486 A | 10/1970 | Paulson | |
| 3,575,259 A | 4/1971 | Wilkinson | |
| 3,611,724 A | 10/1971 | Kutney | |
| 3,618,700 A | 11/1971 | Bond | |
| 3,623,494 A | 11/1971 | Poucher | |
| 3,666,043 A | 5/1972 | Eschenburg | |

(Continued)

FOREIGN PATENT DOCUMENTS

| | | |
|---|---|---|
| EP | 2199204 A2 | 6/2010 |
| FR | 2906569 A1 | 4/2008 |

(Continued)

OTHER PUBLICATIONS

Extended European Search Report dated Jan. 14, 2016 issued on Applicant's corresponding European Patent Application No. 15181537.0-1607.

(Continued)

*Primary Examiner* — Justin Seabe
(74) *Attorney, Agent, or Firm* — Norton Rose Fulbright Canada LLP

(57) ABSTRACT

An aeroengine has an inlet system which includes at least one deformable wall disposed adjacent a peripheral wall of an inlet duct and a plurality of acoustic cells attached to a back side in fluid communication through respective holes in the at least one deformable wall with an inlet duct air flow. The at least one deformable wall selectively forms part of the peripheral wall of the inlet duct when in an undeployed position and selectively forms a curved profile projecting into the inlet duct to reduce line-of-sight noise propagation through the inlet duct.

14 Claims, 7 Drawing Sheets

(56) References Cited

U.S. PATENT DOCUMENTS

| | | |
|---|---|---|
| 3,736,750 A | 6/1973 | Britt |
| 3,820,626 A | 6/1974 | Bonneaud et al. |
| 3,915,413 A | 10/1975 | Sargisson |
| 3,998,048 A | 12/1976 | Derue |
| 4,047,911 A | 9/1977 | Krojer |
| 4,075,833 A | 2/1978 | Sargisson |
| 4,155,221 A * | 5/1979 | Dhoore ................ F04D 29/681 415/119 |
| 4,192,336 A * | 3/1980 | Farquhar ................ F02C 7/045 137/15.1 |
| 4,250,703 A | 2/1981 | Norris et al. |
| 4,346,860 A | 8/1982 | Tedstone |
| 4,463,772 A * | 8/1984 | Ball ................ B64D 33/02 137/15.2 |
| 4,534,167 A | 8/1985 | Chee |
| 4,881,367 A | 11/1989 | Flatman |
| 5,000,399 A | 3/1991 | Readnour |
| 5,315,820 A | 5/1994 | Arnold |
| 5,702,231 A | 12/1997 | Dougherty |
| 5,782,082 A | 7/1998 | Hogeboom et al. |
| 6,089,505 A * | 7/2000 | Gruensfelder ......... B64D 33/02 137/15.1 |
| 6,609,592 B2 * | 8/2003 | Wilson ................ B32B 3/20 181/292 |
| 6,896,099 B2 | 5/2005 | Porte |
| 7,048,229 B2 * | 5/2006 | Sanders ................ F02C 7/042 137/15.1 |
| 7,429,018 B1 * | 9/2008 | Kechely ................ F02C 7/042 137/15.1 |
| 7,588,212 B2 | 9/2009 | Moe |
| 7,857,257 B2 | 12/2010 | Schwarz |
| 7,938,224 B2 * | 5/2011 | Frustie ................ B64D 33/02 181/213 |
| 8,276,707 B2 | 10/2012 | Raimbault et al. |
| 8,286,654 B2 | 10/2012 | Prasad et al. |
| 8,529,188 B2 | 9/2013 | Winter |
| 8,579,076 B2 * | 11/2013 | Ayle ................ F02C 7/045 181/210 |
| 2011/0000548 A1 * | 1/2011 | Sanders ................ B64D 33/02 137/1 |
| 2012/0325325 A1 | 12/2012 | Quackenbush et al. |

FOREIGN PATENT DOCUMENTS

| | | |
|---|---|---|
| GB | 761235 A | 11/1956 |
| GB | 2266340 A | 10/1993 |
| WO | 0236951 | 5/2002 |

OTHER PUBLICATIONS

Extended European Search Report dated Jan. 14, 2016 issued on Applicant's corresponding European Patent Application No. 15181596.6-1607.

Extended European Search Report dated Jan. 14, 2016 issued on Applicant's corresponding European Patent Application No. 15181618.8-1607.

Extended European Search Report dated Jan. 14, 2016 issued on Applicant's corresponding European Patent Application No. 15181594.1-1607.

* cited by examiner

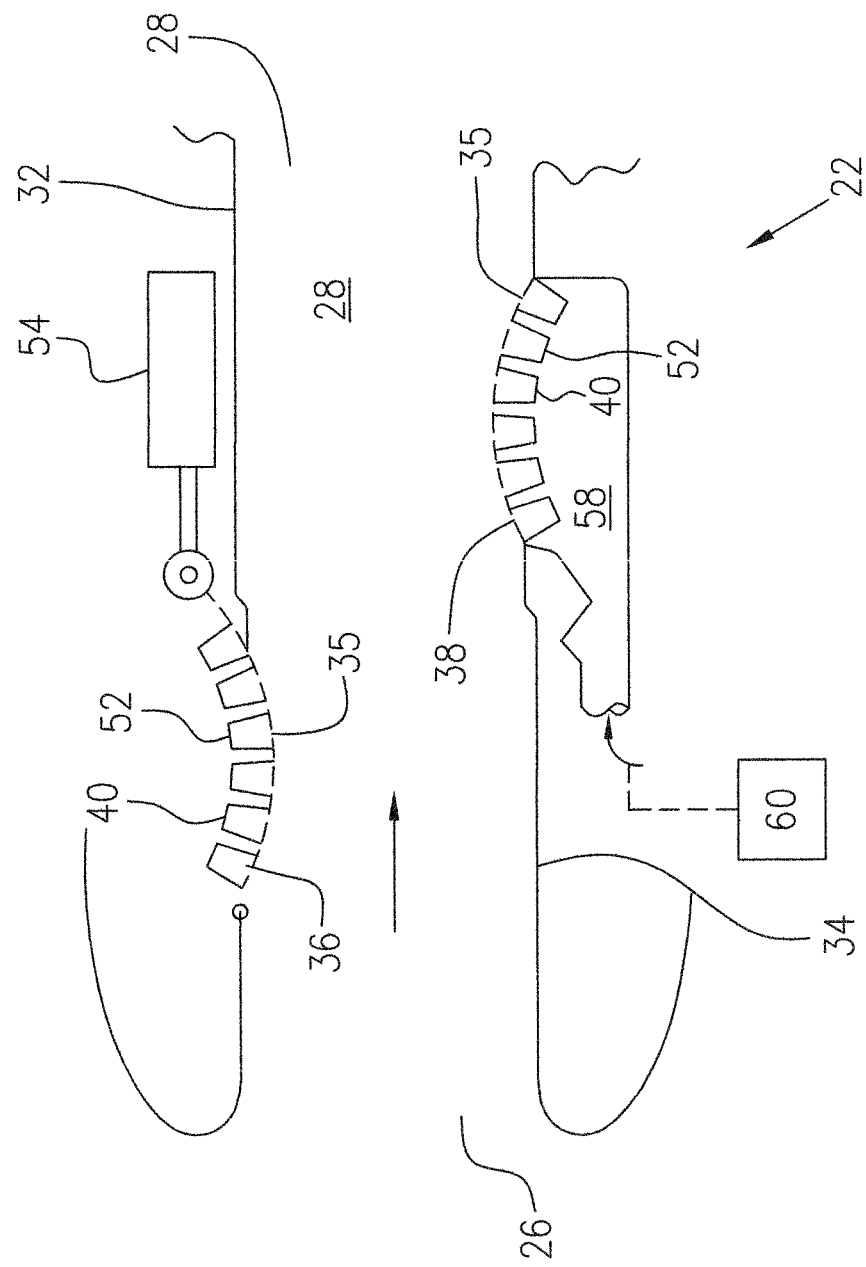

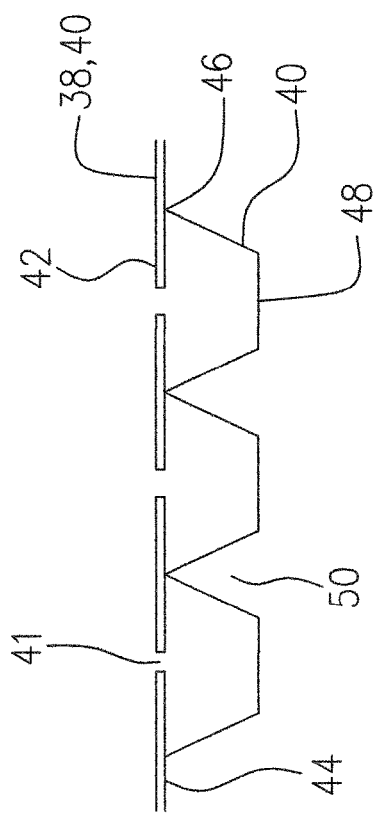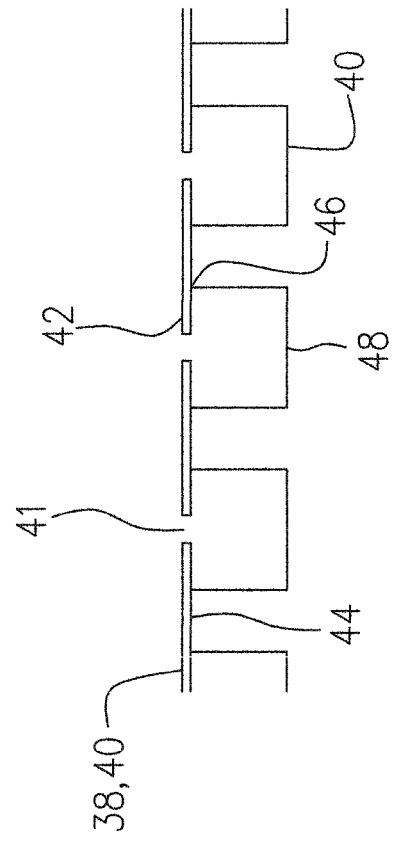

LOW NOISE AEROENGINE INLET SYSTEM

TECHNICAL FIELD

The described subject matter relates generally to aeroengines, and more particularly to aircraft engine inlet systems.

BACKGROUND OF THE ART

Future turboprop aircraft will be larger, heavier and with more powerful engines. Traditionally the aircraft engine industry has pointed to the propellers as the dominant noise source, but with modern electronic propeller control strategies, propeller contribution to the total noise of the engine is reduced and compressor noise propagating from the engine intake can become the dominant source of noise. This is particularly true during the approach phase of flight just before landing. At approach conditions the pressure recovery performance of the engine inlet is less important than in other flight phases since the engine operates at lower power and the conditions are not maintained for long enough to be significant for block fuel burn. Consequently, the industry has made a great effort to improve inlet noise attenuation capabilities, particularly under flight approach conditions.

Accordingly, there is a need to provide an improved engine inlet system for aircraft gas turbine engines.

SUMMARY

In one aspect, there is provided an aeroengine having a compressor inlet comprising an inlet duct for directing an air flow to a compressor, and at least one deformable wall providing a portion of a peripheral wall of the inlet duct and deformable between an undeployed and a deployed position, the at least one deformable wall having a first surface exposed to the air flow and a second surface opposite to the first surface, a plurality of acoustic cells being attached to the second surface of the at least one deformable wall, the at least one deformable wall having a plurality of holes extending therethrough from first to second surface and being in communication with the respective acoustic cells, the at least one deformable wall in the undeployed position being shaped as part of the peripheral wall to substantially avoid interfering with the air flow through the inlet duct, and the at least one deformable wall in the deployed position being deformed to project into the inlet duct to reduce an effective cross-sectional area of the inlet duct to reduce line-of-sight noise propagation.

In another aspect, there is provided an aeroengine having an inlet system comprising an inlet duct for directing an air flow from an intake opening to a compressor, having a section including opposed and substantially flat first and second peripheral walls and first and second deformable walls providing a portion of the respective first and second peripheral walls and being deformable between undeployed and deployed positions, the first and second deformable walls each including a plurality of panels pivotally connected one to another to allow pivotal movement of the panels relative to respective adjacent panels about respective parallel axes oriented transverse to a direction of the air flow, the first and second deformable walls in the undeployed position each being substantially flat to substantially avoid interfering with the air flow and the deformable walls in the deployed position each projecting into the inlet duct from the respective first and second peripheral walls to reduce an effective cross-sectional area of the inlet duct to reduce line-of-sight noise propagation.

Further details and other aspects of the described subject matter will be apparent from the detailed description and drawings included below.

DESCRIPTION OF THE DRAWINGS

Reference is now made to the accompanying figures in which:

FIG. 3 is a schematic partial cross-sectional view of the turboprop aeroengine of FIG. 1, illustrating the inlet system having the variable intake noise attenuation apparatus in a deployed position in the inlet duct;

FIG. 4 is a schematic partial cross-sectional view of a flexible skin with a plurality of acoustic cells attached thereto according to one embodiment;

FIG. 5 is a schematic partial cross-sectional view of a flexible skin with a plurality of acoustic cells attached thereto, according to another embodiment;

It will be noted that throughout the appended drawings, like features are identified by like reference numerals.

DETAILED DESCRIPTION

Figure 1:
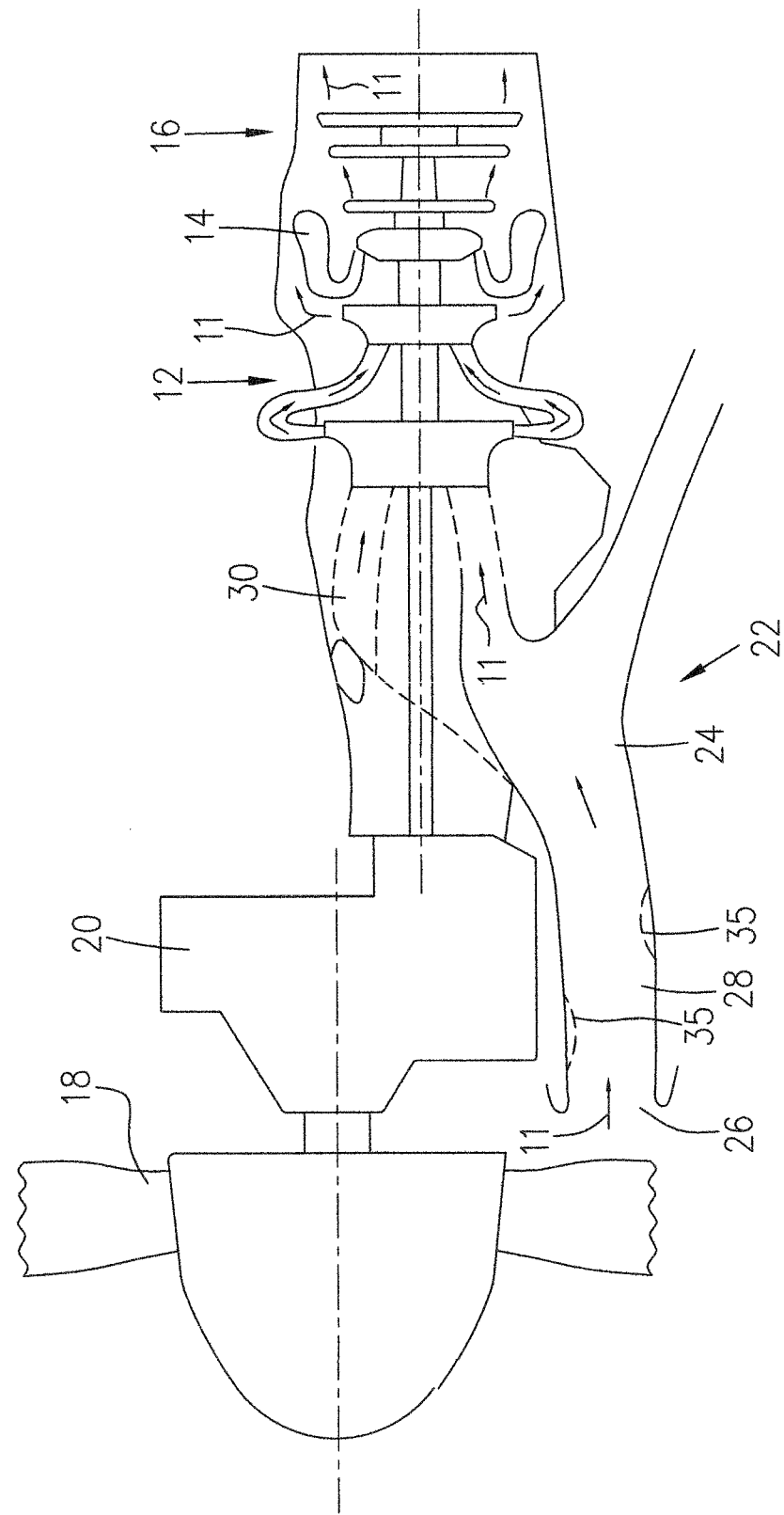
FIG. 1 is a schematic cross-sectional view of a turboprop aeroengine as an example illustrating application of the described subject matter.

FIG. 1 illustrates a turboprop aeroengine as an example of the application of the described subject matter, which generally includes in serial flow communication (indicated by arrows 11) a compressor section 12 for pressurizing air, a combustor 14 in which the pressurized air is mixed with fuel and ignited for generating an annular stream of hot combustion gases, and a turbine section 16 for extracting energy from the combustion gases to drive the compressor rotors in the compressor section 12 and to further drive a propeller 18 through a reduction gear box 20.

It should be noted that the terms downstream and upstream are defined with respect to the direction of the air flow entering into and passing through the engine, indicated by arrows 11 in FIG. 1.

In this example, the turboprop engine may provide an inlet system 22 having an inlet duct 24 for directing the air flow indicated by the arrows 11 in FIG. 1, from an inlet opening 26 to a first compressor rotor (not numbered) of the compressor section 12. The inlet duct 24 according to one embodiment, may have an upstream portion 28 (intake portion) and a downstream portion 30 (engine inlet portion) which is annular around the power shaft (not numbered) of the engine, to direct the air flow in an annular stream toward the first compressor rotor of the compressor section 12.

Figure 6:
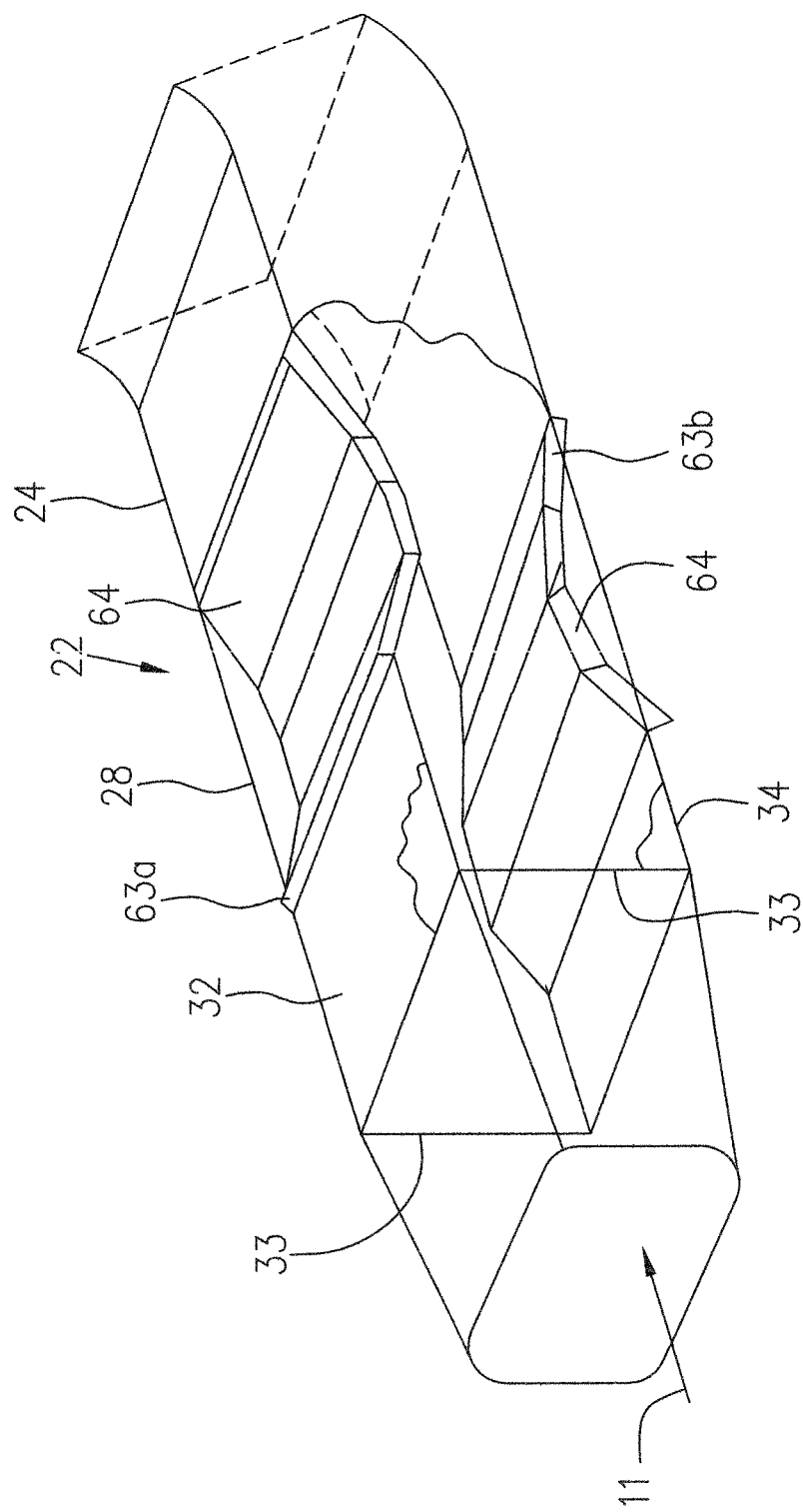
FIG. 6 is a schematic partial perspective view of the inlet system having the variable intake noise attenuation apparatus in a deployed position in the inlet duct, according to another embodiment.

Referring to FIGS. 1-6 and according to one embodiment, the upstream portion 28 of the inlet duct 24 may be defined with a peripheral wall (not numbered) having opposed and substantially parallel top and bottom walls 32, 34 with, for example, curved or rounded side walls (not shown) or flat side walls 33 as shown in FIG. 6, to form a substantially rectangular cross-section. A variable intake noise attenuation apparatus (not numbered) may be provided in the inlet system 22 disposed within the upstream portion 28 of the inlet duct 24 and may be selectively operative between an undeployed position and a deployed position which will be further discussed hereinafter.

The variable intake noise attenuation apparatus according to one embodiment, may include two deformable walls (or at least one deformable wall) which may be made from flexible material to form flexible skins 36, 38, disposed adjacent the respective top and bottom peripheral walls 32, 34. Flexibility of the flexible skins 36, 38 may be required only in one direction in accordance with the direction of the air flow 11. Each of the flexible skins 36, 38 may have a first surface 42 exposed to the air flow to form part of an inner surface of the inlet duct 24 and may have a second surface 44 opposite to the first surface 42. A plurality of acoustic cells 40 may be attached to the second surface 44 of the respective flexible skins 36, 38. The respective flexible skins 36 and 38 may have a plurality of small holes 41 (see FIGS. 4 and 5 in which only skin 38 is shown) extending therethrough and being in communication with the respective acoustic cells 40.

Figure 2:
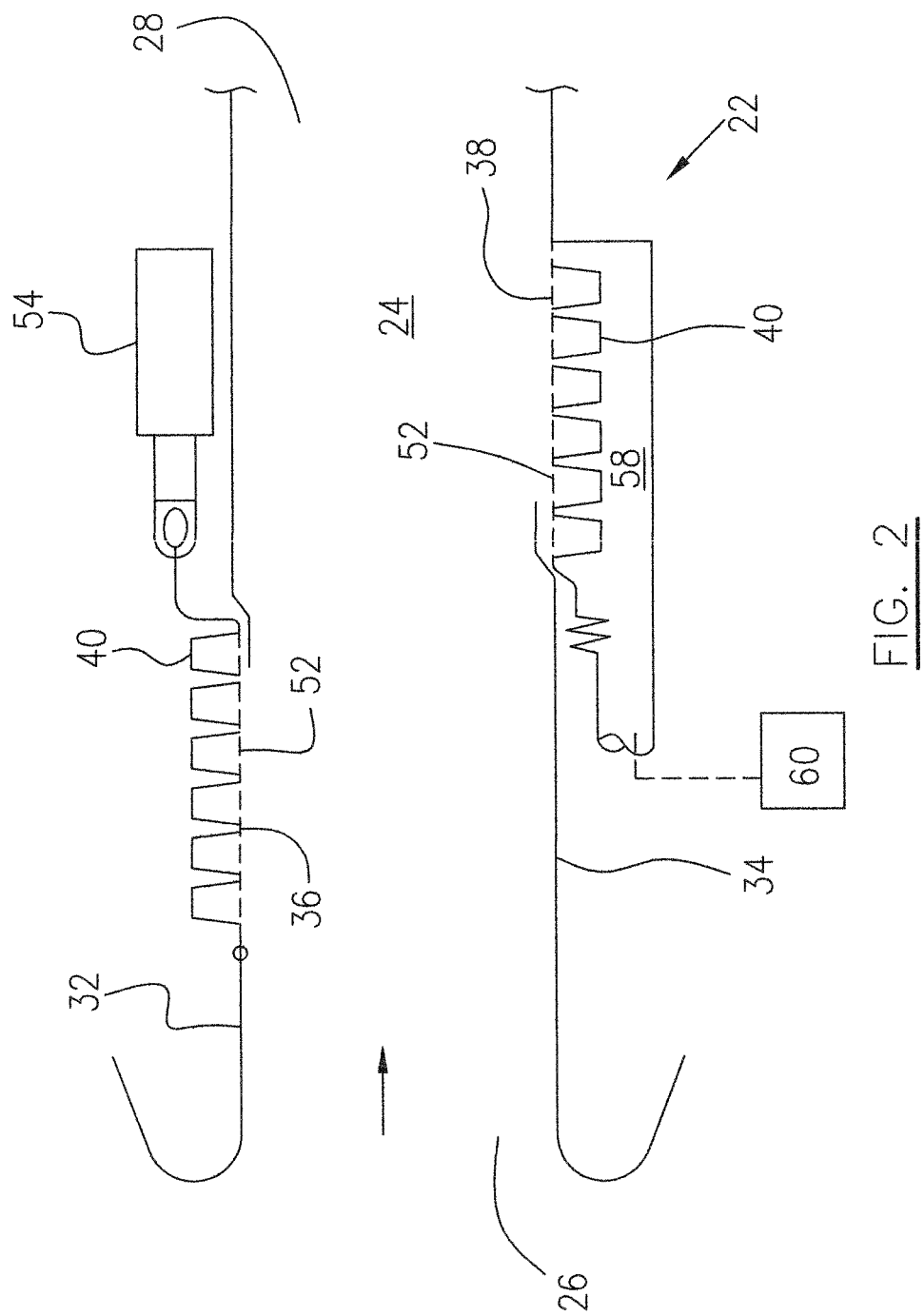
FIG. 2 is a schematic partial cross-sectional view of the turboprop aeroengine of FIG. 1, illustrating an inlet system having a variable intake noise attenuation apparatus in an undeployed position in an inlet duct.

When the variable inlet noise attenuation apparatus is in the undeployed position as shown in FIG. 2, the flexible skins 36, 38 are substantially flat with respect to the respective top and bottom peripheral walls 32, 34 such that the first surface 42 (exposed to the air flow) of the respective flexible skins 36, 38 extends substantially in the direction of the air flow as indicated by the arrows 11 in FIG. 1, in order to avoid interfering with the air flow. When the variable intake noise attenuation apparatus is in the deployed position as illustrated in FIG. 3, the respective flexible skins 36, 38 form a curved profile 35 projecting from the respective top and bottom peripheral walls 32, 34 inwardly into the inlet duct 24 in order to reduce noise in line-of-sight propagation.

The flexible skins 36, 38 having perforations in communication with the acoustic cells 40 attached to the second surface 44 (back surface), provide an acoustic treatment area within the inlet duct 24 to absorb noise energy. When the flexible skins 36, 38 change from a substantially flat shape to the curved profile 35, the acoustic treatment area provided by the flexible skins 36, 38 increases. When the flexible skins 36, 38 are in the curved profile 35 projecting into the inlet duct 24, the curved profile 35 may constitute a curved ridge extending substantially perpendicular to the direction of the air flow, thereby reducing the noise in line-of-sight propagation. The variable inlet noise attenuation apparatus may be deployed during flight approach or landing operations in order to reduce the level of community noise.

The acoustic cells 40 may each have a bottom end 46 attached to the second surface 44 of the respective flexible skins 36, 38 and a top end 48 distal to the bottom end 46. The top end 48 of the respective acoustic cells 40 according to one embodiment may have a dimension smaller than a dimension of the bottom end 46, as shown in FIG. 4, such that angular spaces 50 formed between the adjacent acoustic cells 40 allow the top ends 48 of the adjacent acoustic cells 40 to move toward one another without interference when the respective flexible skins 36, 38 are bent to form the curved profile 35 which causes the second surface 44 (back surface) to become a concave curvature. For example, the acoustic cells 40 may be configured as conical, truncated conical, trapezoidal, etc. which allows the acoustic cells 40 on the respective flexible skins 36, 38 very close one to another to have a relative acoustic treatment effectiveness.

Optionally, the acoustic cells 40 according to another embodiment may be spaced apart one from another by a gap between the adjacent acoustic cells 40 as shown in FIGS. 3-5 in order to avoid interference between adjacent acoustic cells when the respective flexible skins 36, 38 are bent to cause the second surface 44 (the back surface) to become a concave curvature (the curved profile 35 of the deployed position). In this arrangement, the acoustic cells 40 may offer more configuration selections. For example, the acoustic cells 40 may be selected not only from conical, truncated conical and trapezoidal, but also from other shapes such as cylindrical, square, semi sphere, etc.

The flexible skins 36, 38 according to one embodiment may be positioned in the upstream portion 28 of the inlet duct 24, with one positioned in a relatively upstream location and the other positioned in a relatively downstream location. In such a location arrangement, the curved ridges formed by the respective flexible skins 36, 38 which extend substantially perpendicular to the direction of the air flow and are indicated by the curved profile 35, may be positioned in a sequence in the direction of the air flow in order to avoid formation of a narrow throat in the inlet duct 24, thereby maximizing line-of-sight blockage for noise attenuation, without creating excessive throttling.

Installation of the flexible skins may be achieved in different ways. The flexible skins 36, 38 according to one embodiment may be made of sheet metal, composite, re-informed composite or thermal plastic material which can be resiliently deformed such as by bending. An aperture 52 (see FIGS. 2 and 3) may be provided in the respective top and bottom peripheral walls 32, 34 of the inlet duct 24 and may be covered by the respective flexible skins 36, 38 when in the substantially flat shape in the undeployed position. The respective flexible skins 36, 38 in their curved profile 35 may project through the respective apertures 52 into the inlet duct 24. The flexible skins 36, 38 may be sized greater than the aperture 52 in the air flow direction, and equal or slightly smaller than the aperture 52 in the direction transverse to the air flow direction. The flexible skins may be placed outside of the inlet duct. The flexible skins 36, 38 may be affixed to the respective top and bottom peripheral walls 32, 34 at one of the respective front or rear edges of the aperture 52. At the other of the forward and rear edges of the aperture 52, a free end (not numbered) of the flexible skins 36, 38 may overlap a portion of the respective top and bottom peripheral walls 32, 34 and may be movable relative to the respective top and bottom peripheral walls 32, 34. The free end of the respective flexible skins 36, 38 may be operatively connected to a linear actuator 54 which may be disposed outside of the inlet duct 24 and may be supported by the engine. It should be understood that a nacelle skin (not shown) of the aeroengine may be positioned around the upstream portion 28 of the inlet duct 24 and the flexible skins 36, 38 with the attached acoustic cells 40 as well as the linear actuator 54 may be covered by the nacelle skin.

The flexible skins 36, 38 according to one embodiment may have a substantially flat original shape in an unloaded state as shown in FIG. 2 which can be selectively forcibly bent to form the required curved profile 35 in a loaded state as shown in FIG. 3, by for example a pushing force. When the linear actuator 54 is not actuated, the flexible skins 36, 38 will recover into their unloaded state in which they have the substantially flat original shape.

Alternatively, the flexible skins 36, 38 according to another embodiment may be made in the curved profile 35 as their original shape in the unloaded state, as shown in FIG. 3 and can be selectively forcibly pulled by the linear actuator 54 to become substantially flat in the loaded state. When the linear actuator 54 is not actuated, the flexible skins 36, 38 may recover their original curved profile 35 of the unloaded state.

Alternatively, the flexible skins 36, 38 according to a further embodiment may be made from a suitable material having sufficient flexibility and may be attached to a device to cover and seal an opening of an air chamber 58 as shown in FIGS. 2 and 3. The air chamber 58 may be in communication with an air source (not shown) of the engine and may be operatively connected to an air pressure control device 60 which selectively changes air pressure in the air chamber 58 in order to selectively forcibly deform the respective flexible skins 36, 38 into the required shape. For example, the flexible skins 36, 38 may be made in a substantially flat profile as the original shape in an unloaded state and may be deformed into the curved profile 35 by increasing the air pressure within the air chamber 58 to create the loaded state, or may be made in the curved profile 35 as the original shape in an unloaded state and may be deformed into a substantially flat shape by reducing air pressure in the air chamber 58 to create the loaded state. When the material of the flexible skins 36, 38 in this embodiment is resilient but not generally elastically stretchable, the respective flexible skin 36, 38 may be configured to have a limited wavy portion (not numbered) as shown in FIG. 2 which can be stretched as shown in FIG. 3, to allow the substantially flat flexible skins 36, 38 to be stretched to form the curved profile 35 when in the loaded state for the deployed position. The wavy portion of the respective flexible skins 36, 38 may be positioned beyond the edge of the apertures 52 of the respective top and bottom peripheral walls 32, 34 of the inlet duct 24 such that the wavy portion of the respective skins 36, 38 is well covered by the respective top and bottom peripheral walls 32, 34 and is not exposed to the air flow passing through the inlet duct 24.

The curved profile 35 of the respective flexible skins 36, 38 may be configured to prevent unacceptable levels of inlet pressure distortion in the aeroengine.

Optionally, the upstream portion 28 of the inlet duct may have flat side walls 33 as shown in FIG. 6, and a strip (not shown) curved in the required profile (or pegs, bumpers or other similar means) may be attached to the inner surface of the flat side walls 33 to accurately limit the curvature of the flexible skins in the deployed position and to provide air seals between the sidewalls and the side edges of the flexible skins in the deployed position.

Figure 7A:
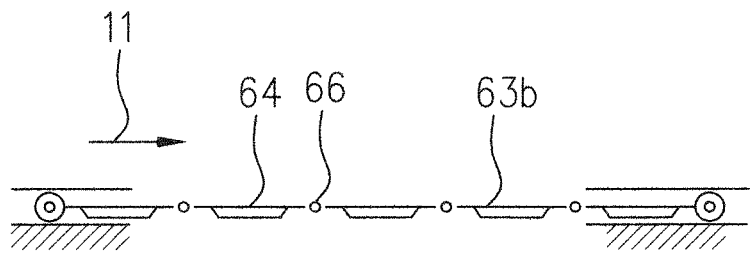
FIGS. 7A and 7B are schematic partial cross-sectional views of the inlet system of FIG. 6, illustrating the variable intake noise attenuation apparatus in the respective undeployed and deployed positions.
Figure 7B:
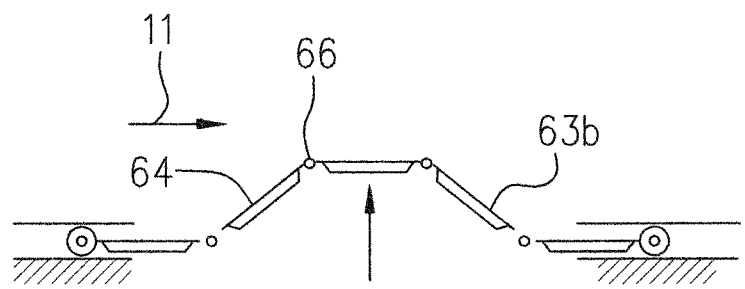

Referring to FIGS. 1 and 6-9C and according to another embodiment, the flexible skins may be replaced by a plurality of panels 64 which may be rigid and configured to form deformable walls 63a and 63b (only 63b is shown in FIGS. 7A-9C for simplicity of illustration). The panels 64 in each of the deformable walls 63a and 63b are pivotally connected one to another, for example by hinges (not numbered) to allow pivotal movement of the panels 64 relative to respective adjacent panels 64, about respective parallel pivotal axes 66, which are shown in FIGS. 7A and 7B extending into the paper of the drawings. The parallel pivotal axes 66 are oriented transverse to the direction of the air flow 11. The deformable walls 63a and 63b provide a portion of each of the respective top and bottom peripheral walls 32, 34 and are deformable between the undeployed position as shown in FIGS. 7A and 9A, and the deployed position as shown in FIGS. 7B and 9B. The panel 64 located at one end of the deformable wall 63a or 63b (such as at the most upstream end of the deformable wall) may be affixed to the peripheral top or bottom wall and the panel 64 located at the other end of the deformable wall (such as at the most downstream end thereof) may be moveably supported on a track to allow a center portion of the deformable wall 63a or 63b to be pushed into the inlet duct in a direction transverse to the direction of air flow 11, while one end of the deformable wall 63a or 63b is withdrawn on the supporting track, in a direction against the direction of air flow 11.

Figures 8A, 8B:
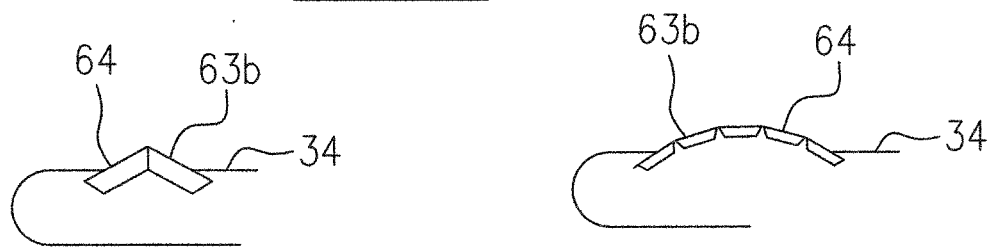
FIGS. 8A-8C are schematic illustrations of the variable intake noise attenuation apparatus in the deployed position, showing alternative structural arrangements.
Figure 8C:
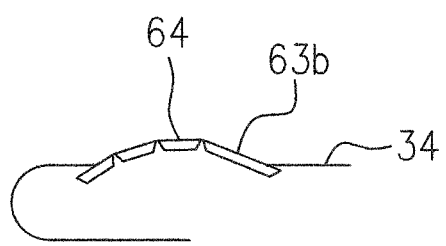

As shown in FIGS. 8A-8C, the deformable wall 63a or 63b may be formed with panels 64 which may be identical, or different in dimension in the direction of the air flow 11. In one example shown in FIG. 8A, the deformable wall 63a or 63b may be formed by only two panels 64 pivotally joined together or as shown in FIGS. 8B and 8C, or formed by multiple panels 64 to provide a smoother curved profile of the deformable wall 63a or 63b when in the deployed position.

Figure 9B:
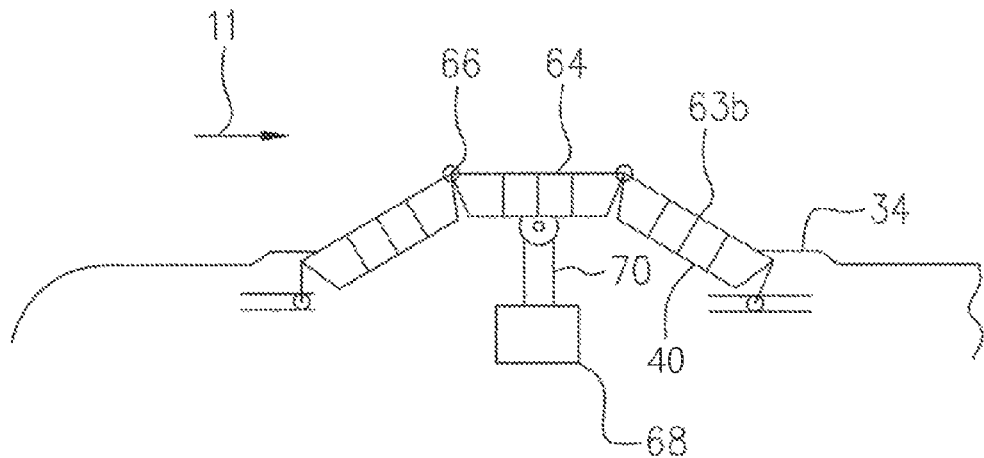
FIGS. 9A and 9B are schematic partial cross-sectional views of the variable intake noise attenuation apparatus of FIG. 6, with acoustic cells in the respective undeployed and deployed positions.
Figure 9A:
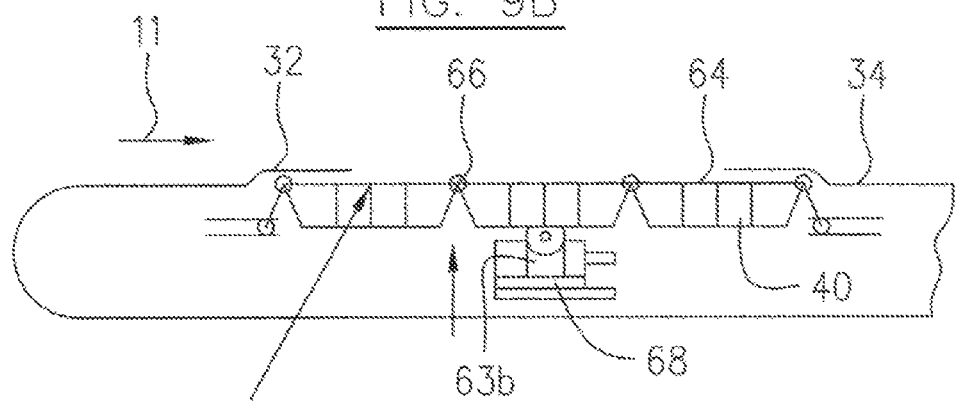

Optionally, similar to the embodiments described with reference to FIGS. 2-5, the deformable walls 63a, 63b formed with the pivotally connected panels 64 may also have a plurality of holes extending through the respective panels (thus through the deformable walls) between the surface of the deformable wall 63a, 63b exposed to the air flow 11 and the opposite surface of the deformable wall 63a, 63b (at the back thereof), similar to the holes 41 illustrated in FIGS. 4 and 5. These holes are in fluid communication with respective acoustic cells 40. As shown in FIGS. 9A and 9B, each panel 64 may include one or more rows of the cells 40, oriented transverse to the direction of the air flow 11. Adjacent rows of acoustic cells 40 attached to the back surface of each panel 64 may be one row spaced apart from another, similar to that shown in FIG. 5, or may be closely disposed one row of acoustic cells 40 immediately adjacent another, as shown in FIGS. 9A and 9B. The acoustic cells 40 located immediately adjacent the respective pivotal axes 66, may be configured to form a triangular space therebetween in order to allow the adjacent panels to be pivoted toward one another when pushed into the inlet duct 24.

An actuator 68 may be provided in the inlet system 22, for example using hydraulic power to push a piston rod 70 which may be oriented transverse to the direction of the air flow 11 and which is operatively connected to a middle panel 64 of each deformable wall 63a or 63b, for deploying or undeploying the deformable wall 63a or 63b, as shown in FIGS. 9A and 9B.

Figure 9C:
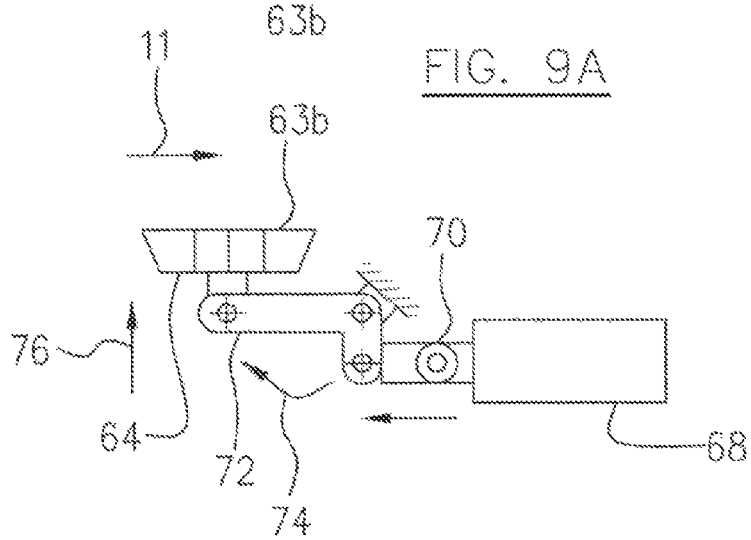
FIG. 9C is a schematic partial cross-sectional view of the inlet system of FIG. 6, showing an actuator.

Optionally, the actuator 68 may be provided as in FIG. 9C, with the piston rod 70 oriented in the direction of the air flow 11 and pivotally connected to one end of an L-shaped arm 72. The L-shaped arm 72 may be pivotally supported on a stationary structure of the inlet system and may be pivotally connected at the other end to one of the panels 64 of the deformable wall 63a or 63b. In operation, when the piston rod 70 of the actuator 68 is pushed to extend, resulting in rotation of the L-shaped arm 72 in a clock-wise direction as indicated by arrow 74 and further resulting in an upward motion of the end of the L-shaped arm 72 pivotally connected to the panel 64. A push force is created as indicated by arrow 76, which forces the deformable wall 63a or 63b into the deployed position.

Other features of the inlet system 22 having the pivotally connected panels to form the deformable walls, are similar to the embodiments described above with reference to FIGS. 1-5, and will not be redundantly described herein.

Optionally, bleed air extraction for ejectors or similar suction devices for boundary layer control, may help with more difficult inlet geometries because the duration of approach or landing flight conditions is short and is not at critical engine power levels.

The above description is meant to be exemplary only, and one skilled in the art will recognize that changes may be made to the embodiments described without departing from the scope of the described subject matter. For example, the described subject matter may be applicable to aeroengines configured differently from the turboprop aeroengine illustrated in the drawings. Modifications which fall within the scope of the described subject matter will be apparent to those skilled in the art, in light of a review of this disclosure, and such modifications are intended to fall within the appended claims.

The invention claimed is:

1. A compressor inlet for an aeroengine, the compressor inlet comprising: an inlet duct for directing an air flow to a compressor of the aeroengine, and at least one deformable wall providing a portion of at least one peripheral wall of the inlet duct and deformable between an undeployed and a deployed position, the at least one deformable wall having a first surface exposed to the air flow and a second surface opposite to the first surface, a plurality of acoustic cells being attached to the second surface of the at least one deformable wall, the at least one deformable wall having a plurality of holes extending therethrough from first to second surface and being in communication with the respective acoustic cells, the at least one deformable wall in the undeployed position being shaped as part of the at least one peripheral wall to substantially avoid interfering with the air flow through the inlet duct, and the at least one deformable wall in the deployed position being deformed to project into the inlet duct to reduce an effective cross-sectional area of the inlet duct to reduce line-of-sight noise propagation, the acoustic cells each comprise a bottom end attached to the second surface of the at least one deformable wall and a top end distal to the bottom end, the top ends of adjacent acoustic cells being spaced apart by a gap between the adjacent acoustic cells when the at least one deformable wall is in the undeployed position to avoid interference between the adjacent acoustic cells.

2. The compressor inlet as defined in claim 1 wherein the at least one deformable wall comprises a plurality of panels pivotally connected one to another to allow relative pivotal axes oriented transverse to a direction of the air flow.

3. The compressor inlet as defined in claim 1 wherein the at least one deformable wall is made of a flexible material.

4. The compressor inlet as defined in claim 1 wherein the acoustic cells positioned on the second surface of the at least one deformable wall, are spaced apart one from another to avoid interference between the adjacent acoustic cells when the at least one deformable wall forms the curved profile causing the second surface thereof to become the concave curvature.

5. The compressor inlet as defined in claim 1 wherein the top end has a dimension smaller than a dimension of the bottom end, resulting in increased spaces between the top ends of the adjacent acoustic cells to avoid interference between the adjacent acoustic cells when the at least one deformable wall forms a curved profile causing the second surface thereof to become a concave curvature.

6. The compressor inlet as defined in claim 1 wherein the compressor inlet comprises a linear actuator for selectively actuating the at least one deformable wall between the undeployed position and the deployed position.

7. The compressor inlet as defined in claim 1 wherein the compressor inlet comprises an air chamber to which the at least one deformable wall is attached and a device for selectively changing air pressure in the air chamber to result in a change of a shape of the at least one deformable wall.

8. The compressor inlet as defined in claim 1 wherein the at least one deformable wall in the deployed position forms a curved ridge extending substantially perpendicular to a direction of the air flow.

9. The compressor inlet as defined in claim 1 wherein the inlet duct comprises an aperture in the at least one peripheral wall thereof, the at least one deformable wall being attached to the at least one peripheral wall to cover the aperture when the at least one deformable wall is in the undeployed position.

10. The compressor inlet as defined in claim 1 wherein the at least one peripheral wall of the inlet duct comprises flat top and bottom walls and flat side walls, the at least one deformable wall being operatively attached to the respective top and bottom walls.

11. The compressor inlet as defined in claim 3 comprising means for selectively forcing deformation of the at least one deformable wall between an unloaded state and a loaded state, the unloaded state being one of the undeployed and deployed positions and the loaded state being the other one of the undeployed and deployed positions.

12. The compressor inlet as defined in claim 11 wherein the at least one deformable wall is substantially flat in said unloaded state and is selectively deformed into the curved profile in the loaded state.

13. The compressor inlet as defined in claim 11 wherein the at least one deformable wall has the curved profile in said unloaded state and is selectively deformed into a substantially flat shape in the loaded state.

14. A compressor inlet for an aeroengine, the compressor inlet comprising: an inlet duct for directing an air flow to a compressor of the aeroengine, and at least one deformable wall providing a portion of at least one peripheral wall of the inlet duct and deformable between an undeployed and a deployed position, the at least one deformable wall having a first surface exposed to the air flow and a second surface opposite to the first surface, a plurality of acoustic cells being attached to the second surface of the at least one deformable wall, the at least one deformable wall having a plurality of holes extending therethrough from first to second surface and being in communication with the respective acoustic cells, the at least one deformable wall in the undeployed position being shaped as part of the at least one peripheral wall to substantially avoid interfering with the air flow through the inlet duct, and the at least one deformable wall in the deployed position being deformed to project into the inlet duct to reduce an effective cross-sectional area of the inlet duct to reduce line-of-sight noise propagation, the acoustic cells each comprising a bottom end attached to the second surface of the at least one deformable wall and a top end distal to the bottom end, the top end having a dimension smaller than a dimension of the bottom end, resulting in increased spaces between top ends of adjacent acoustic cells to avoid interference between adjacent acoustic cells when the at least one deformable wall forms a curved profile causing the second surface thereof to become a concave curvature.

* * * * *